United States Patent
Mitsuyuki (10) Patent No.: US 11,440,131 B2
(45) Date of Patent: Sep. 13, 2022

(54) ULTRASONIC JOINING APPARATUS

(71) Applicant: LINK-US CO., LTD., Yokohama (JP)

(72) Inventor: Jun Mitsuyuki, Yokohama (JP)

(73) Assignee: LINK-US Co., Ltd., Kanagawa (JP)

( * ) Notice: Subject to any disclaimer, the term of this patent is extended or adjusted under 35 U.S.C. 154(b) by 16 days.

(21) Appl. No.: 17/057,879

(22) PCT Filed: Nov. 6, 2019

(86) PCT No.: PCT/JP2019/043483
§ 371 (c)(1),
(2) Date: Nov. 23, 2020

(87) PCT Pub. No.: WO2020/105434
PCT Pub. Date: May 28, 2020

(65) Prior Publication Data
US 2021/0197308 A1 Jul. 1, 2021

(30) Foreign Application Priority Data
Nov. 20, 2018 (JP) .............................. JP2018-217546

(51) Int. Cl.
*B23K 20/10* (2006.01)

(52) U.S. Cl.
CPC ................................ *B23K 20/106* (2013.01)

(58) Field of Classification Search
CPC .. B23K 20/10–106; B23K 1/06; B23K 31/12; B29C 65/08
USPC ...................... 228/1.1, 110.1; 158/73.1–73.5
See application file for complete search history.

(56) References Cited

U.S. PATENT DOCUMENTS

| | | | | |
|---|---|---|---|---|
| 5,277,355 A | * | 1/1994 | Weaver | B23K 20/004 228/4.5 |
| 5,368,216 A | * | 11/1994 | Sakakura | H01L 24/78 156/73.2 |
| 5,540,807 A | * | 7/1996 | Akiike | B06B 3/02 228/110.1 |
| 5,931,367 A | | 8/1999 | Sato et al. | |
| 5,947,364 A | | 9/1999 | Tamura et al. | |
| 6,073,827 A | * | 6/2000 | Razon | H01L 24/85 228/180.5 |

(Continued)

FOREIGN PATENT DOCUMENTS

| JP | 02192138 A | * | 7/1990 | ............. H01L 24/78 |
|---|---|---|---|---|
| JP | 05235116 A | * | 9/1993 | ............. H01L 24/78 |

(Continued)

OTHER PUBLICATIONS

Machine translation of JP-05235116-A (no date available).*

(Continued)

*Primary Examiner* — Kiley S Stoner
(74) *Attorney, Agent, or Firm* — Carrier Blackman & Associates, P.C.; William D. Blackman; Joseph P. Carrier (57) ABSTRACT

Provided is an ultrasonic joining apparatus capable of easily changing the elliptical ratio and the amplitude of a complex vibration. An ultrasonic joining apparatus (1) includes an ultrasonic LT horn (4) transmitting an ultrasonic vibration to a horn tip (6), in which the horn tip (6) is attached to a lower side of a tip portion (4b) of the ultrasonic LT horn (4) and detachable adjustment screws (5) are attached to positions (screw holes 4b1, 4b2, 4b4) not interfering with the horn tip (6) of the tip portion (4b).

12 Claims, 7 Drawing Sheets

(56) References Cited

U.S. PATENT DOCUMENTS

| | | | | |
|---|---|---|---|---|
| 6,135,338 A * | 10/2000 | Kyomasu | ............... | H01L 24/78 228/1.1 |
| 6,189,761 B1 * | 2/2001 | Kyomasu | ............ | B23K 20/106 228/8 |
| 8,511,534 B2 * | 8/2013 | Kakutani | ............... | H01L 24/85 228/110.1 |
| 2003/0047583 A1 | 3/2003 | Kyomasu | ................ | B06B 3/00 228/110.1 |
| 2003/0062395 A1 * | 4/2003 | Li | ...................... | B23K 20/106 228/110.1 |
| 2003/0136523 A1 * | 7/2003 | Takahashi | ............ | B23K 20/106 257/E21.511 |
| 2004/0011848 A1 * | 1/2004 | Farassat | ................. | H01L 24/78 228/110.1 |
| 2004/0211812 A1 * | 10/2004 | Hizukuri | ................ | H01L 24/75 228/1.1 |
| 2006/0169388 A1 * | 8/2006 | Shimizu | ............. | B29C 66/1122 156/580.2 |
| 2006/0169739 A1 * | 8/2006 | Kim | ....................... | H01L 24/48 228/110.1 |
| 2008/0011809 A1 * | 1/2008 | Seyama | ................ | B23K 20/10 228/1.1 |
| 2008/0121679 A1 * | 5/2008 | Li | ............................ | B06B 3/00 228/1.1 |
| 2009/0255979 A1 * | 10/2009 | Saito | ...................... | H01L 24/75 228/1.1 |
| 2011/0108184 A1 * | 5/2011 | Cai | ....................... | B23K 20/10 156/580.2 |
| 2012/0037687 A1 | 2/2012 | Matsumura | | |
| 2014/0305996 A1 * | 10/2014 | Takanami | ............... | H01L 24/78 228/1.1 |
| 2017/0005064 A1 * | 1/2017 | Sugito | .................. | B23K 20/005 |
| 2017/0005065 A1 * | 1/2017 | Sugito | .................. | B23K 20/106 |
| 2017/0190002 A1 * | 7/2017 | Yoshida | ................. | B23K 20/10 |
| 2018/0178313 A1 * | 6/2018 | Nakayama | ........... | B23K 31/125 |
| 2018/0219345 A1 * | 8/2018 | Böhm | .................... | H01R 4/187 |
| 2019/0176262 A1 * | 6/2019 | Gabre | ................... | B23K 20/10 |

FOREIGN PATENT DOCUMENTS

| | | | | |
|---|---|---|---|---|
| JP | 07153801 A | * | 6/1995 | ............. B06B 3/02 |
| JP | H08-294673 A | | 11/1996 | |
| JP | H09-108855 A | | 4/1997 | |
| JP | H10-52768 A | | 2/1998 | |
| JP | H10-323620 A | | 12/1998 | |
| JP | 11121546 A | * | 4/1999 | .......... B23K 20/106 |
| JP | 2017-064779 A | | 4/2017 | |

OTHER PUBLICATIONS

Machine translation of JP-10323620-A (no date available).*
Office Action with Search Report and Written Opinion dated Oct. 27, 2021 issued in the corresponding Singapore Patent Application No. 11202011801T.

* cited by examiner

NO ADJUSTMENT SCREW

FIG.5B

ADJUSTMENT SCREW (UPPER SIDE) + SPACER (THICKNESS OF 4 mm)

FIG.5C

ADJUSTMENT SCREW (UPPER SIDE) + SPACER (THICKNESS OF 6 mm)

FIG.5D

ADJUSTMENT SCREW (RIGHT SIDE) + SPACER (THICKNESS OF 3 mm) (1)

FIG.5E

ADJUSTMENT SCREW (RIGHT SIDE) + SPACER (THICKNESS OF 3 mm) (2)

ULTRASONIC JOINING APPARATUS

TECHNICAL FIELD

The present invention relates to an ultrasonic joining apparatus for joining works, such as metals and plastics, by an ultrasonic vibration.

BACKGROUND ART

Conventionally, ultrasonic joining has been utilized to join plastics used for food packs and the like or metals, such as battery components. A common ultrasonic joining apparatus ultrasonically vibrates the tip of a joining tip (tool) to repeatedly apply pressure to joining targets (works) for joining.

For example, in an ultrasonic processing apparatus in Patent Literature 1 below, an ultrasonic transducer for longitudinal waves and an ultrasonic horn for composite vibration conversion are individually connected to an ultrasonic corn by connection screws. Further, a welding tip is installed at the tip of the ultrasonic horn for composite vibration conversion. Metal materials to be welded are held and pressurized by the welding tip, an anvil, and a pressure device.

Further, in the ultrasonic horn for composite vibration conversion, oblique slits are provided. The oblique slits are provided at equal intervals at a plurality of positions in the circumferential direction of the ultrasonic horn for composite vibration conversion in a node portion of a longitudinal vibration. A longitudinal vibration mode is converted into a composite vibration mode containing a longitudinal vibration and a torsional vibration in terms of vector.

CITATION LIST

Patent Literature

Patent Literature 1: Japanese Patent Application Laid-Open No. 8-294673

SUMMARY OF INVENTION

Technical Problem

In the ultrasonic horn for composite vibration conversion described in Patent Literature 1, a plurality of types of horn tips different in length or thickness according to works is used in some cases. However, there has been a problem that it is difficult to appropriately adjust the elliptical ratio and the amplitude according to the horn tip type.

Although it is possible to prepare the ultrasonic horn for composite vibration conversion according to the horn tip type to obtain desired elliptical ratio and amplitude, a labor for the preparation and a cost burden increase.

The present invention has been made in view of such circumstances. It is an object of the present invention to provide an ultrasonic joining apparatus capable of easily changing the elliptical ratio and the amplitude of a composite vibration.

Solution to Problem

The present invention provides an ultrasonic joining apparatus for joining a plurality of works stacked between a first member and a second member. The joining apparatus is arranged at a position facing the first member and operates by vibrating the first member by an ultrasonic vibration in which a first vibration component, in a first direction perpendicular to a direction in which the first member presses, and a second vibration component in a second direction orthogonal to the first direction are combined. The ultrasonic joining apparatus includes an ultrasonic vibration transmitting portion for transmitting the ultrasonic vibration to the first member, in which the first member is attached to a tip portion of the ultrasonic vibration transmitting portion, and a detachable vibration adjustment member is attached to a position not interfering with the first member.

The ultrasonic joining apparatus of the present invention presses the first member against the works regardless of the arrangement direction (horizontal direction, tilt direction) of the first member and the second member, and then vibrates the first member by the ultrasonic vibration (composite vibration) in which the component in the first direction perpendicular to the press direction and the component in the second direction perpendicular to the first direction are combined. This enables this apparatus to join the works while removing impurities on the work surface.

According to this ultrasonic joining apparatus, the first member is attached to the tip portion of the ultrasonic vibration transmitting portion and the vibration adjustment member is detachably attached at the position not interfering with the first member. When the vibration adjustment member is attached, the amplitude and the resonance frequency of the first member change depending on the position, weight, and the like thereof, so that the aspect ratio of the composite vibration changes. More specifically, this apparatus can easily change the composite vibration by adjusting the vibration adjustment member according to the type of the first member and the work or the like.

It is preferable in the ultrasonic joining apparatus of the present invention that an attachment portion to which the vibration adjustment member is attached is provided at a position opposite to the first member with respect to the center of the tip portion of the ultrasonic vibration transmitting portion.

According to this configuration, the first member is attached to the lower side of the tip portion of the ultrasonic vibration transmitting portion and the attachment portion of the vibration adjustment member is provided at the position on the opposite side with respect to the center of the tip portion. This apparatus can change the composite vibration particularly by generating a component in the major axis direction of the first member by the weight of the vibration adjustment member.

Further, in the ultrasonic joining apparatus of the present invention, two or more of the attachment portions to which the vibration adjustment members are attached may be provided at symmetrical positions with respect to the center of the tip portion of the ultrasonic vibration transmitting portion.

According to this configuration, a joining tip is attached to the lower side of the tip portion of the ultrasonic vibration transmitting portion and the plurality of attachment portions for the vibration adjustment members are provided at the symmetrical positions with respect to the center of the tip portion. This apparatus can change the composite vibration by attaching the vibration adjustment members to horizontally symmetrical positions to thereby adjust the balance of a component perpendicular to the major axis direction of the first member (horizontal component of the first member), for example.

Further, it is preferable in the ultrasonic joining apparatus of the present invention that the attachment portion is a recess portion or a hole portion, a female screw thread is formed in the recess portion or the hole portion, and the vibration adjustment member has a male screw portion.

The attachment portion provided in the ultrasonic vibration transmitting portion has the recess portion or the hole portion (through-hole) in which the female screw thread is formed. Further, the vibration adjustment member has the male screw portion. This enables this apparatus to change the composite vibration by surely bonding the vibration adjustment member to the recess portion or the hole portion and adjusting the projection length of the vibration adjustment member.

Further, it is preferable in the ultrasonic joining apparatus of the present invention that a spacer capable of adjusting the weight is provided and the spacer is arranged between the vibration adjustment member and the outer periphery of the ultrasonic vibration transmitting portion.

The ultrasonic joining apparatus of the present invention includes the spacer capable of adjusting the weight between the vibration adjustment member and the outer periphery of the ultrasonic vibration transmitting portion. This enables this apparatus to change the composite vibration by changing the shape, thickness, and the like of the spacer to thereby change the weight without changing the size of the vibration adjustment member.

Further, it is preferable in the ultrasonic joining apparatus of the present invention that the first member is a joining tip and the second member is an anvil.

According to this configuration, the first member is the joining tip and, for example, the joining tip is attached to the lower side of the tip portion of the ultrasonic vibration transmitting portion and the detachable vibration adjustment member is attached to the upper side of the tip portion. This enables this apparatus to change the composite vibration.

DESCRIPTION OF EMBODIMENTS

Hereinafter, an embodiment of an ultrasonic joining apparatus of the present invention is described referring to the drawings.

Figure 1:
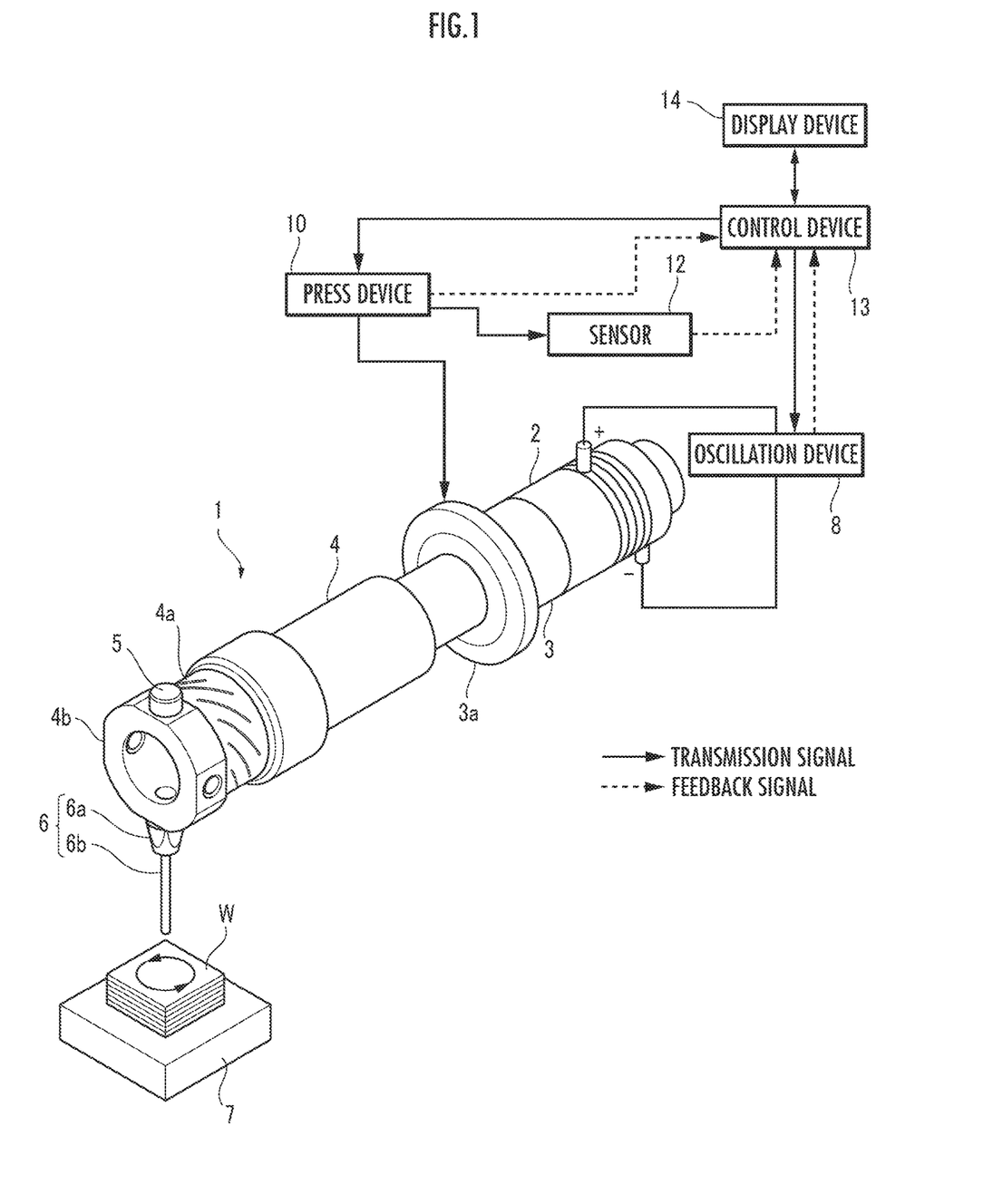
FIG. 1 is a view explaining the entire configuration of an ultrasonic joining apparatus according to an embodiment of the present invention.

First, the entire configuration of an ultrasonic joining apparatus 1 according to the embodiment of the present invention is described with reference to FIG. 1. The ultrasonic joining apparatus 1 is an apparatus for joining (welding) joining targets (works), such as metal plates, utilizing an ultrasonic composite vibration described later. The ultrasonic joining apparatus 1 is mainly used for joining electrodes of lithium ion batteries, semiconductor devices, and the like and metals of the same type or different types.

The ultrasonic joining apparatus 1 contains an ultrasonic transducer (Langevin Type) 2, an ultrasonic amplifying horn 3, an ultrasonic LT horn 4 (longitudinal-torsional horn), a horn tip 6, and an anvil 7. Further, an oscillation device 8, a pressure device 10, a sensor 12, a control device 13, and a display device 14 also form a part of the ultrasonic joining apparatus 1.

When a power supply voltage is applied to the oscillation device 8 from a power supply (not illustrated), a voltage signal is transmitted to a positive electrode and a negative electrode of the ultrasonic transducer 2, the ultrasonic transducer 2 vibrates, so that an ultrasonic vibration (about 20 kHz) is generated. The ultrasonic vibration generated in the ultrasonic transducer 2 is transmitted to the ultrasonic amplifying horn 3 having a cylindrical shape attached to one end portion of the ultrasonic transducer 2, so that the vibration amplitude is amplified. Further, the ultrasonic vibration is transmitted to the ultrasonic LT horn 4 having a cylindrical shape (equivalent to the "ultrasonic vibration transmitting portion" of the present invention) attached to one end portion (end portion on the side not facing the ultrasonic transducer 2) of the ultrasonic amplifying horn 3.

Although the ultrasonic vibration generated in the ultrasonic transducer 2 is transmitted in the major axis direction of the ultrasonic amplifying horn 3 and the ultrasonic LT horn 4 so far (longitudinal vibration of ultrasonic waves), a vibration component converted into a transverse vibration from a longitudinal vibration is generated by a plurality of oblique slits 4a of the ultrasonic LT horn 4. Then, the ultrasonic vibration (composite vibration) is transmitted to the horn tip 6 (equivalent to the "joining tip" and the "first member" of the present invention) screwed to one end portion (end portion on the side not facing the ultrasonic amplifying horn 3) of the ultrasonic LT horn 4.

As illustrated in the figure, a tip portion 4b of the ultrasonic LT horn 4 is formed into a ring shape (cylindrical shape) having a hollowed central portion. Although details are described later, screw holes are formed at upper-and-lower and right-and-left positions of the tip portion 4b in a front view. An adjustment screw 5 (equivalent to the "vibration adjustment member" of the present invention) is attached to the screw hole at the upper position. The horn tip 6 is attached to the screw hole at the lower position. The tip portion of the ultrasonic amplifying horn 3 is not limited to the cylindrical shape and may have a polygonal shape. Further, a column or a polygonal column may be acceptable.

The adjustment screw 5 is changeable in length, thickness, and head size of the screw. Thus, the weight of the adjustment screw 5 changes, and therefore the amplitude, resonance frequency, and the like of the composite vibration change, and further the elliptical ratio of the composite vibration can be changed.

The horn tip 6 contains a truncated conical base portion 6a and a tip portion 6b contacting works W in joining. By adjusting the phase of the ultrasonic vibration with the oscillation device 8, the composite vibration (for example, elliptical vibration) is generated in one end portion of the ultrasonic LT horn 4, so that the tip portion 6b of the horn tip 6 vibrates the surface of the works W while drawing an elliptical orbit. This vibration eliminates impurities of the surface of the works W and further promotes the plastic deformation of the surface of the works W. The horn tip 6 has various shapes and can be replaced according to the type of the works W for use.

When the composite vibration is further described, this vibration is a vibration in which a first vibration component in a first direction, perpendicular to the press direction when the tip portion 6b of the horn tip 6 presses the works W, and a second vibration component in a second direction orthogonal to the first direction are combined. When the first vibration component in the first direction and the second vibration component in the second direction are 1:1, a circular vibration is generated. In the case of 2:1, an elliptical vibration is generated.

Further, a block for pressurization with high rigidity (not illustrated) contacts a flange portion 3a of the ultrasonic amplifying horn 3. Therefore, the ultrasonic joining apparatus 1 can be vertically moved through the block for pressurization moving up and down by controlling the pressure device 10 by the control device 13. Then, the works W are placed on the anvil 7 (equivalent to the "second member" of the present invention) which is a pedestal, whereby the tip portion 6b of the horn tip 6 contacts the works W, so that static pressure (200 to 800 N in joining) is applied.

Further, a sensor (stroke sensor) 12 detecting the displacement of the block for pressurization is provided and acquires the work W pushing amount of the horn tip 6. The sensor 12 feeds back a coordinate change in the vertical direction of the horn tip 6 in joining to the control device 13 (the dashed line indicates a feedback signal), whereby the pushing amount is kept constant. Therefore, an actuator having a high response speed is used for the pressure device 10.

An operator can set the pushing amount from the display device 14. Further, a pressure sensor may be provided in addition to the sensor 12 to perform control to keep the static pressure constant. Thus, the ultrasonic joining apparatus 1 gives the composite vibration while adjusting the pushing amount or the static pressure in joining the works W, thereby surely promoting the joining (solid phase joining).

Herein, when the solid phase joining is further described, metal atoms have a surface covered with oil and fats, an oxide film, or the like, and thus are brought into a state where approach of the atoms is blocked, for example. In the ultrasonic joining, the ultrasonic vibration is given to metal to generate strong frictional force on the metal surface. Thus, the oxide film or the like on the metal surface is removed, so that purified and activated metal atoms appear on the joined surface.

The ultrasonic vibration is further given to the metal surface in this state, whereby the atomic motion is activated due to a temperature increase caused by frictional heat, and then mutual attraction between the atoms occurs, so that a solid phase joining state is generated.

Next, details of the ultrasonic LT horn 4 are described with reference to FIG. 2A and FIG. 2B.

Figure 2A:
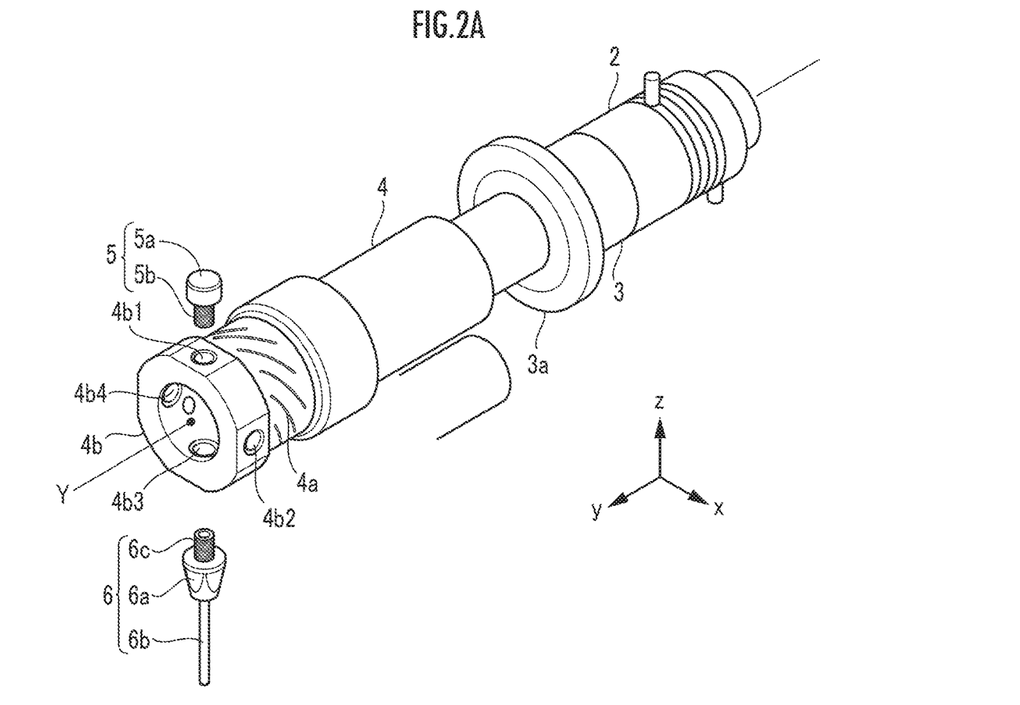
FIG. 2A is a view explaining an ultrasonic LT horn of the ultrasonic joining apparatus of FIG. 1 (1).
Figure 2B:
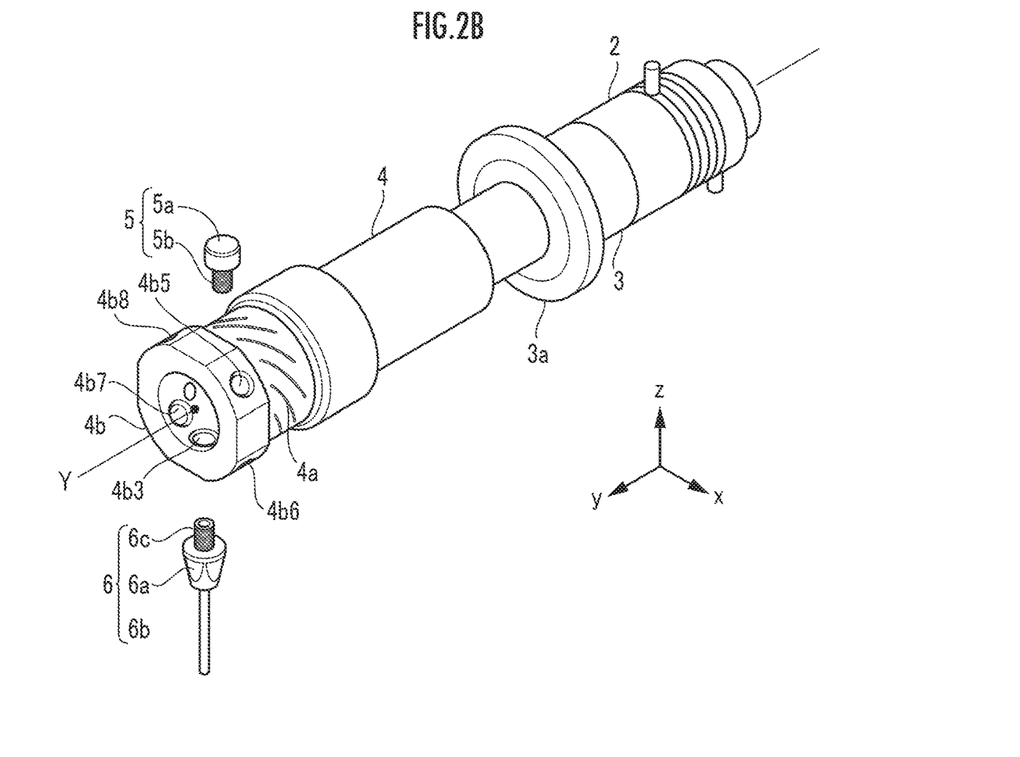
FIG. 2B is a view explaining the ultrasonic LT horn of the ultrasonic joining apparatus of FIG. 1 (2).

As illustrated in FIG. 2A, the tip portion 4b of the ultrasonic LT horn 4 has a ring shape (cylindrical shape) and screw holes 4b1 to 4b4 (equivalent to the "attachment portion" of the present invention) which are through-holes are provided at the upper-and-lower and right-and-left positions as viewed from the direction of a cylinder center axis Y (center O) of the tip portion 4b. Further, female screw (for example, M6) threads are formed in the screw holes 4b1 to 4b4. The screw hole 4b3 at the lower side of the tip portion 4b serves as a screw hole for the horn tip 6.

Since the attachment portion 6c of the horn tip 6 is the male screw portion, the horn tip 6 is attached to the screw hole 4b3 in the form of tightening the screw and fixed by a tool. Further, a screw type is adopted, whereby the replacement to a horn tip matched with a purpose is facilitated.

The adjustment screw 5 contains a head portion 5a and an attachment portion 5b. In the attachment portion 5b, a male screw thread is formed. Therefore, the adjustment screw 5 is attached to the screw hole 4b1 located on the side opposite to the horn tip 6 in the form tightening the screw and fixed by a tool. The adjustment screw 5 may be attached to any of the screw holes 4b1, 4b2, 4b4 not interfering with the horn tip 6.

In the tip portion 4b of the ultrasonic LT horn 4, the position not interfering with the horn tip 6 is not limited to the above-described upper-and-lower and right-and-left positions of the tip portion 4b. As illustrated in FIG. 2B, screw holes 4b5 to 4b8 may also be provided at oblique 45° positions as viewed from the direction of the cylinder center axis Y. Although the screw hole 4b3 is required for the attachment of the horn tip 6, the screw holes 4b1, 4b2, 4b4 (see FIG. 2A) may not be provided in this case as illustrated in the figure.

In the ultrasonic joining apparatus 1, even when the adjustment screw 5 is attached to any position, the resonance frequency of the composite vibration changes, so that the elliptical ratio, amplitude, and the like change. In particular, in order to amplify the amplitude of the composite vibration in the horn tip 6, it is effective to set the length of the horn tip 6 to an integer multiple of the half wavelength.

Two or more of the adjustment screws 5 may be attached to the tip portion 4b of the ultrasonic LT horn 4. Hereinafter, an example of how to attach the adjustment screws 5 is described with reference to FIG. 3A to FIG. 3C.

Figure 3A:
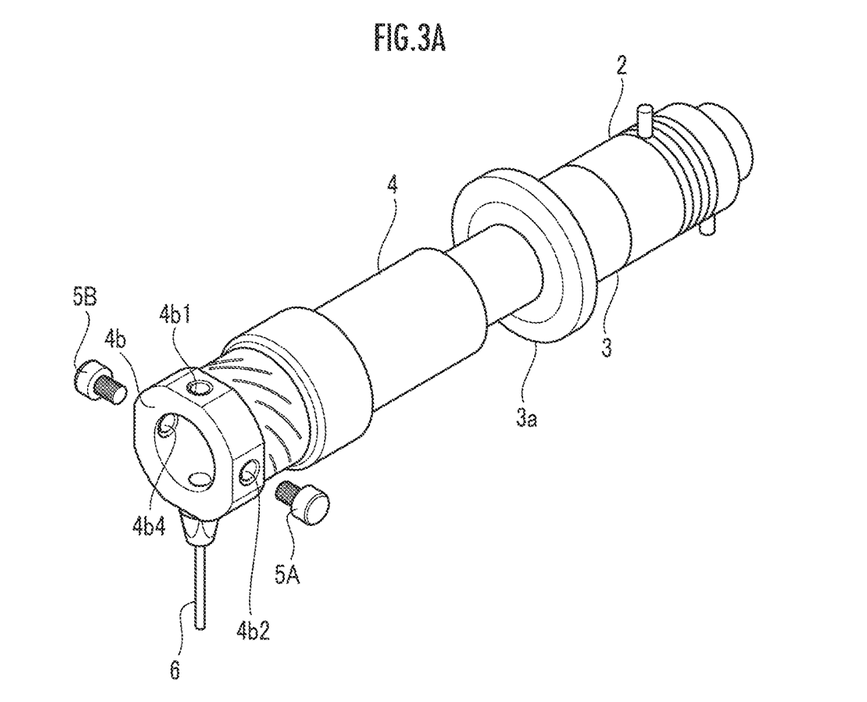
FIG. 3A is an example of how to attach adjustment screws to the tip portion of the ultrasonic LT horn (1).

First, as illustrated in FIG. 3A, adjustment screws 5A, 5B can be attached to the screw holes 4b2, 4b4, respectively, located at horizontally symmetrical positions of the tip portion 4b. This enables the ultrasonic joining apparatus 1 to adjust a component perpendicular to the major axis direction of the horn tip 6 (horizontal component of the horn tip 6) to change the composite vibration.

In order to vibrate the horn tip 6 at a resonance frequency to obtain a desired elliptical vibration, it is effective to slightly lose a horizontal balance, which is confirmed by an experiment. Therefore, the adjustment screws 5A, 5B may not necessarily have the same weight and the same length and the weight and the length may be changed as appropriate.

Figure 3B:
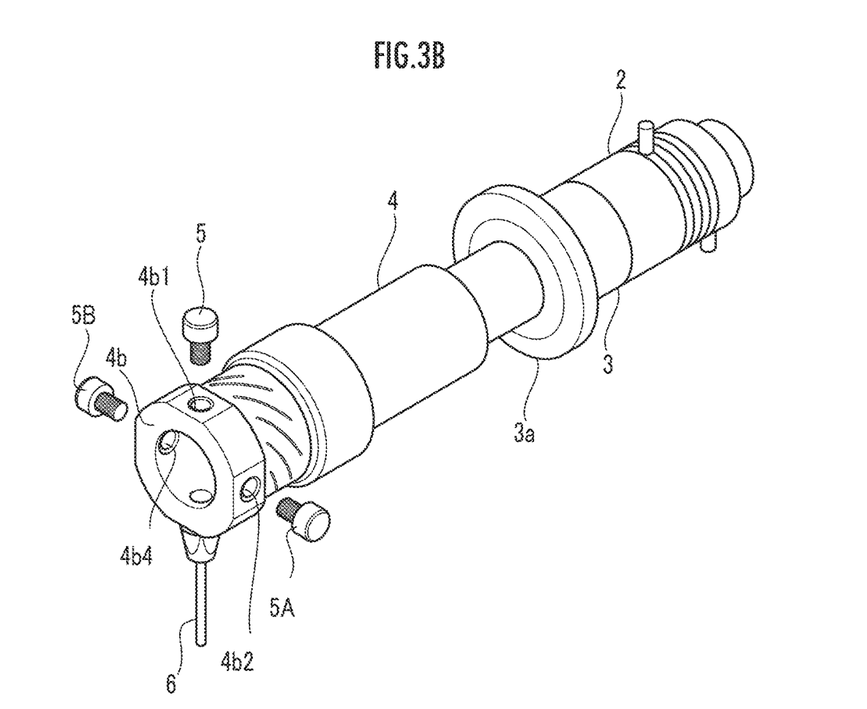
FIG. 3B is an example of how to attach the adjustment screws to the tip portion of the ultrasonic LT horn (2).

Next, as illustrated in FIG. 3B, the adjustment screws 5, 5A, 5B can be attached to the three screw holes 4b1, 4b2, 4b4, respectively, of the tip portion 4b. This enables the ultrasonic joining apparatus 1 to adjust a component in the major axis direction of the horn tip 6 and a component perpendicular to the major axis direction to change the composite vibration.

By attaching the three adjustment screws 5, 5A, 5B to the tip portion 4b, the weight of the entire tip portion 4b also changes. Accordingly, the ultrasonic joining apparatus 1 can generate a different composite vibration as compared with the case where the two adjustment screws 5A, 5B are attached as illustrated in FIG. 3A.

Figure 3C:
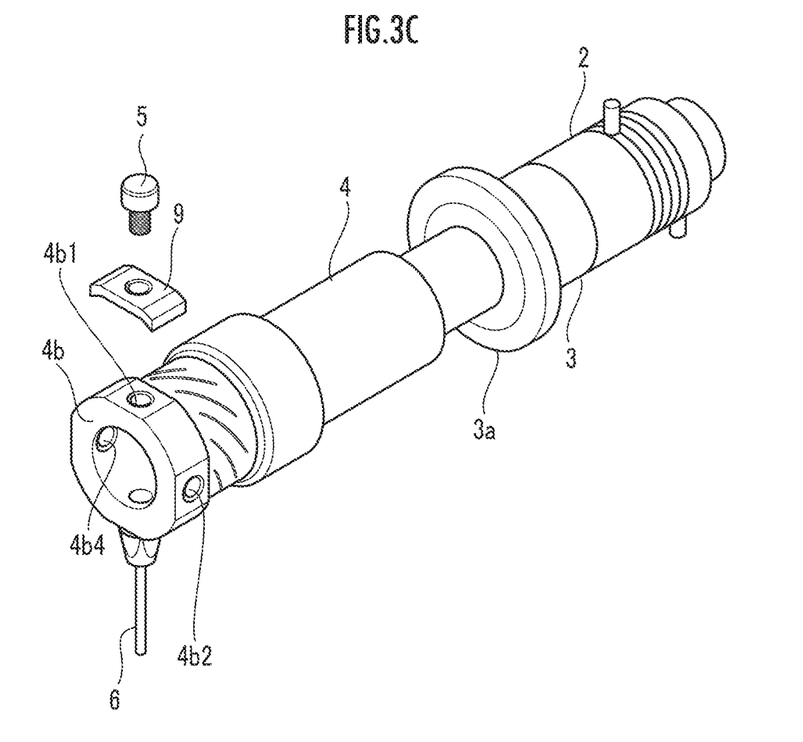
FIG. 3C is an example of how to attach the adjustment screw to the tip portion of the ultrasonic LT horn (3).

Further, as illustrated in FIG. 3C, in attaching the adjustment screw 5 to the screw hole 4b1 of the tip portion 4b, a spacer 9 may be placed therebetween. As the spacer 9, a metal plate matched with the shape of the tip portion 4b illustrated in the figure or a circular washer can be used and the weight can be adjusted by the shape or (and) the thickness.

As illustrated in FIG. 3A and FIG. 3B, when using the plurality of adjustment screws, even when the size of the adjustment screws is the same, the weight, balance, and the like are changed depending on the presence or absence or the size of the spacer 9. This enables the ultrasonic joining apparatus 1 to change the composite vibration.

Next, a measurement method and measurement results of the composite vibration of the horn tip 6 are described with reference to FIG. 4, FIG. 5A to FIG. 5E.

Figure 4:
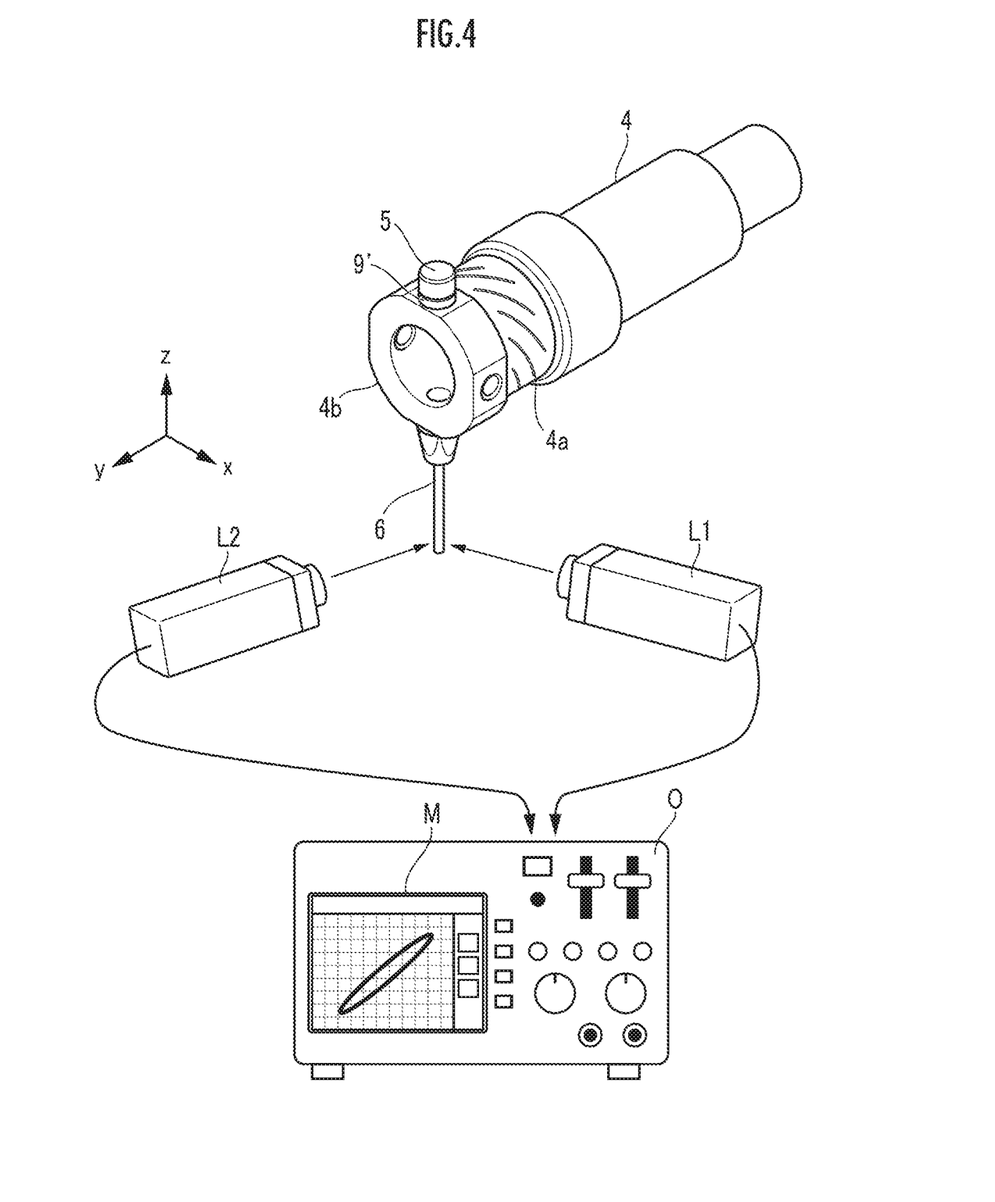
FIG. 4 is a view explaining a measurement method of a composite vibration of a horn tip.

First, as illustrated in FIG. 4, the horn tip 6 is attached to the lower side of the tip portion 4b (screw hole 4b3) of the ultrasonic LT horn 4 and the adjustment screw 5 is attached to the upper side of the tip portion 4b (screw hole 4b1), i.e., position on the opposite side of the horn tip 6. In this case, the weight is adjusted by placing a circular spacer 9' between the tip portion 4b and the adjustment screw 5.

For the measurement of the composite vibration of the horn tip 6, laser doppler vibrometers L1, L2 are used. The laser doppler vibrometers L1, L2 emit laser beams (for example, He—Ne laser beams) to the tip of the horn tip 6 to measure a frequency change Δf.

More specifically, the laser doppler vibrometer L1 monitors a vibration in the x-axis direction of the horn tip 6. On the other hand, the laser doppler vibrometer L2 monitors a vibration in the y-axis direction of the horn tip 6. Then, an output of the laser doppler vibrometer L1 is input into CH2 of an oscilloscope O and an output of the laser doppler vibrometer L2 is input into CH1. Thus, an elliptical vibration is displayed on a display portion M as a waveform based on both the outputs.

Figure 5A:
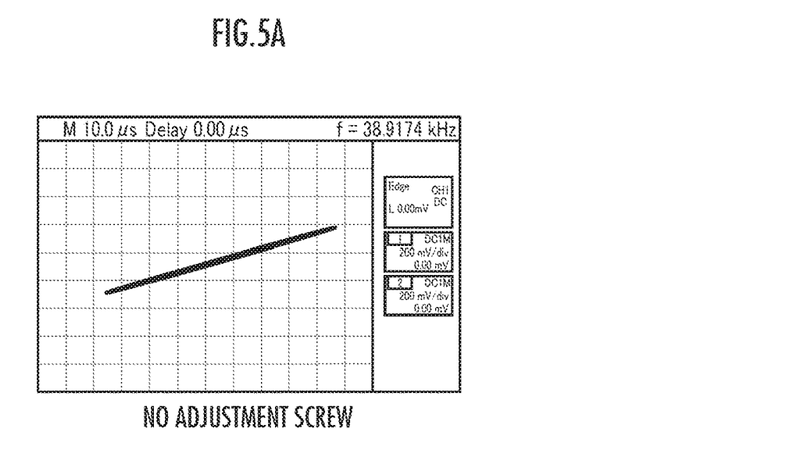
FIG. 5A is a view explaining a measurement result (no adjustment screws) of the composite vibration of the horn tip.

First, FIG. 5A illustrates a waveform when the adjustment screw 5 and the spacer 9' are not attached (resonance frequency f=38.9174 kHz) as a comparative example Herein, an elliptical vibration having a shape similar to a straight line was obtained. The horizontal axis represents a displacement in the y-axis direction of the laser doppler vibrometer L2. The vertical axis represents a displacement in the x-axis direction of the laser doppler vibrometer L1.

Figure 5B:
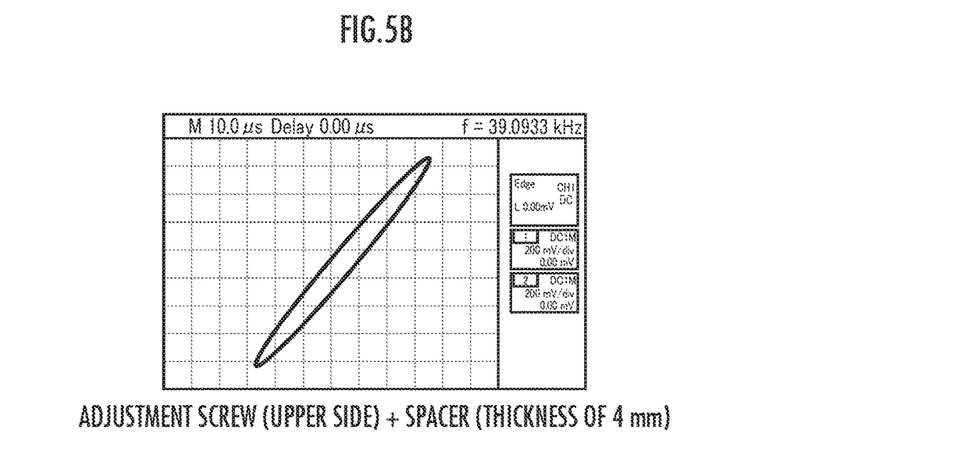
FIG. 5B is a view explaining a measurement result (conditions 1) of the composite vibration of the horn tip.
Figure 5C:
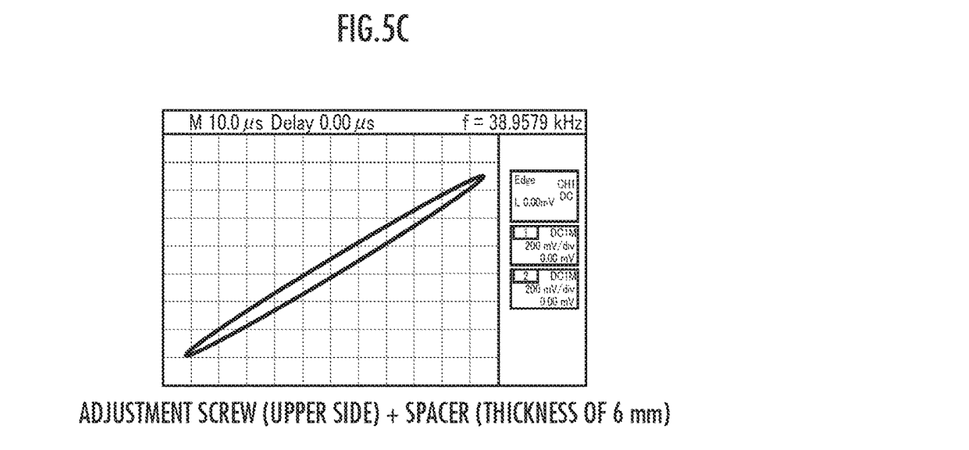
FIG. 5C is a view explaining a measurement result (conditions 2) of the composite vibration of the horn tip.

Next, FIG. 5B and FIG. 5C illustrate waveforms when the adjustment screw 5 and the spacer 9' are attached to the upper side of the tip portion 4b (screw hole 4b1) of the ultrasonic LT horn 4. FIG. 5B illustrates a case where the adjustment screw 5 and the spacer 9' having a thickness of 4 mm were attached (resonance frequency f=39.0933 kHz). The elliptical shape expanded and the tilt increased as compared with FIG. 5A.

FIG. 5C illustrates a case where the adjustment screw 5 and the spacer 9' having a thickness of 6 mm were attached to the upper side of the tip portion 4b (screw hole 4b1) of the ultrasonic LT horn 4 (resonance frequency f=38.9579 kHz). The elliptical shape was crushed and the tilt decreased as compared with FIG. 5B. Thus, a result was obtained that, even in the case of a slight difference in the weight of the spacer 9', the resonance frequency changes and the elliptical ratio changes.

Figure 5D:
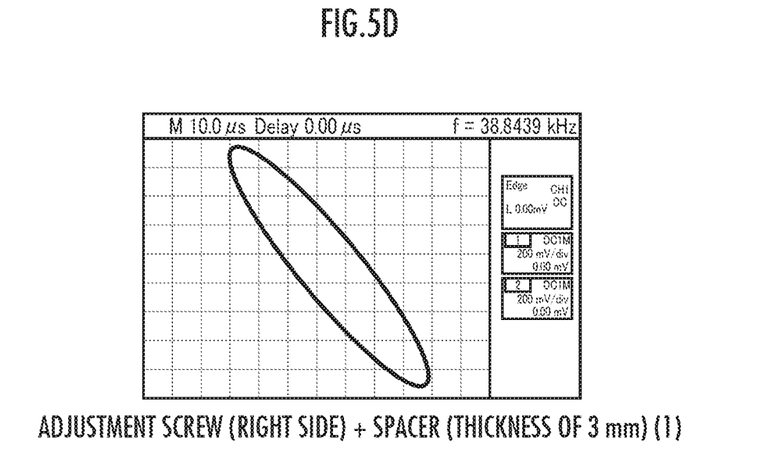
FIG. 5D is a view explaining a measurement result (conditions 3) of the composite vibration of the horn tip.
Figure 5E:
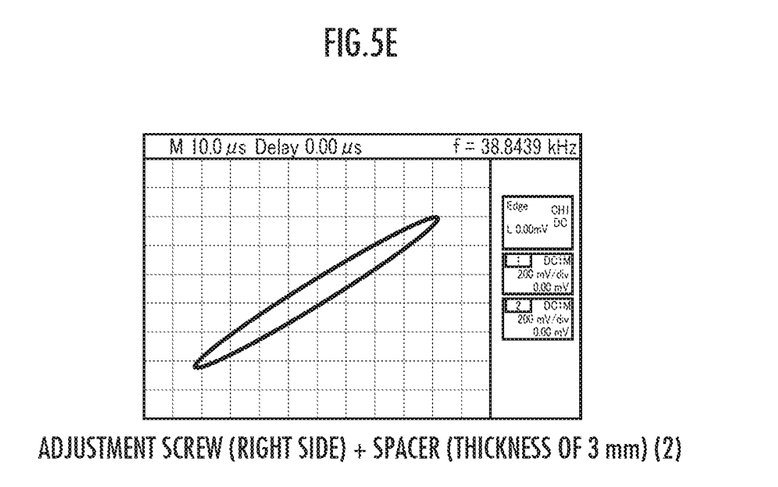
FIG. 5E is a view explaining a measurement result (conditions 4) of the composite vibration of the horn tip.

Next, FIG. 5D and FIG. 5E illustrate waveforms when the adjustment screw 5 and the spacer 9' are attached to the right side of the tip portion 4b (screw hole 4b2) of the ultrasonic LT horn 4 (resonance frequency f=38.8439 kHz). FIG. 5D illustrates a case where the adjustment screw 5 and the spacer 9' having a thickness of 3 mm are attached. In this case, the elliptical shape expanded and the tilt was in the opposite direction as compared with FIG. 5B.

FIG. 5E illustrates a waveform at a resonance point different from that in FIG. 5D, although the conditions are the same as those in FIG. 5D. Thus, a result was obtained that, even in the case of the same conditions, the elliptical ratio and the tilt vary depending on a primary resonance point or a secondary resonance point. As described above, the ultrasonic joining apparatus 1 can easily change the amplitude, elliptical ratio, and the like of the composite vibration by attaching the adjustment screw(s) 5 (5A, 5B) or (and) the spacer 9 (9') to the tip portion 4b of the ultrasonic LT horn 4.

The description above is a part of the embodiment of the present invention and there are various embodiments besides the embodiment above. For example, the "vibration adjustment member" of the present invention is not limited to the adjustment screw. When the vibration adjustment member is a column type not having the male screw portion, a recess portion having a plurality of stages of engagement grooves may be formed in the tip portion of the ultrasonic LT horn. Thus, the projection length to the outer periphery of a tip portion of the column can be adjusted.

Further, the "attachment portion" of the present invention is not limited to the recess portion or the hole portion. For example, a projection having a male screw portion may also be provided in the tip portion of the ultrasonic LT horn. When a female screw thread is formed in the vibration adjustment member at this time, the vibration adjustment member can be surely attached to the tip portion.

Although the above-described horn tip has various types, such as a horn tip having a short tip portion and a horn tip having a recess portion or a projection portion formed in the end surface, any type of horn tip can be attached to the tip portion of the ultrasonic LT horn with an attachment portion (screw). In this case, attention is paid so that an attachment position of the tip portion is not located at a vibration node.

DESCRIPTION OF REFERENCE NUMERALS 1 ultrasonic joining apparatus
2 ultrasonic transducer
3 ultrasonic amplifying horn
3a flange portion
4 ultrasonic LT horn
4a oblique slit
4b tip portion
4b1 to 4b8 screw hole
5, 5A, 5B adjustment screw
5a head portion
5b attachment portion
6 horn tip
6a base portion
6b tip portion
6c attachment portion
7 anvil
8 oscillation device
9, 9' spacer
10 pressure device
12 sensor
13 control device
14 display device
W work

The invention claimed is:
1. An ultrasonic joining apparatus for joining a plurality of works stacked between a first member and a second member arranged at a position facing the first member by vibrating the first member by an ultrasonic vibration, in which a first vibration component in a first direction per- pendicular to a direction in which the first member presses and a second vibration component in a second direction orthogonal to the first direction are combined, the ultrasonic joining apparatus comprising:

an ultrasonic vibration transmitting portion for transmitting the ultrasonic vibration to the first member, the ultrasonic vibration transmitting portion comprising a tip portion having a plurality of attachment portions formed therein, wherein:

the first member comprises a joining tip which is attached to the tip portion of the ultrasonic vibration transmitting portion, and a vibration adjustment member is detachably attached to the tip portion at one of the attachment portions at a position not interfering with the first member, and at a position opposite to the first member with respect to a center of the tip portion of the ultrasonic vibration transmitting portion.

2. The ultrasonic joining apparatus according to claim 1, wherein a separate vibration adjustment member is attached to a plurality of the two or more attachment portions.

3. The ultrasonic joining apparatus according to claim 1, wherein two or more of the attachment portions are provided at symmetrical positions with respect to a center axis of the tip portion of the ultrasonic vibration transmitting portion.

4. The ultrasonic joining apparatus according to claim 1, wherein the attachment portions comprise female threaded openings, and wherein the vibration adjustment member has a male screw portion which threadably engages with one of the threaded openings in the tip portion.

5. The ultrasonic joining apparatus according to claim 4, further comprising a spacer capable of adjusting a weight of the tip portion, wherein the spacer is arranged between an outer portion of the vibration adjustment member and an outer periphery of the ultrasonic vibration transmitting portion.

6. The ultrasonic joining apparatus according to claim 1, wherein the second member is an anvil.

7. The ultrasonic joining apparatus according to claim 1, wherein the tip portion of the ultrasonic vibration transmitting portion comprises a substantially cylindrical member having a hollow central opening formed therein.

8. The ultrasonic joining apparatus according to claim 1, wherein the joining tip and the vibration adjustment member share a common axis.

9. The ultrasonic joining apparatus according to claim 1, wherein a portion of the ultrasonic vibration transmitting portion has a plurality of oblique slits formed therein.

10. The ultrasonic joining apparatus according to claim 1, further comprising a position sensor for sensing a vertical position of the joining tip.

11. The ultrasonic joining apparatus according to claim 1, further comprising a control device and a display device.

12. The ultrasonic joining apparatus according to claim 1, further comprising a pressure sensor.

* * * * *